UNITED STATES PATENT OFFICE.

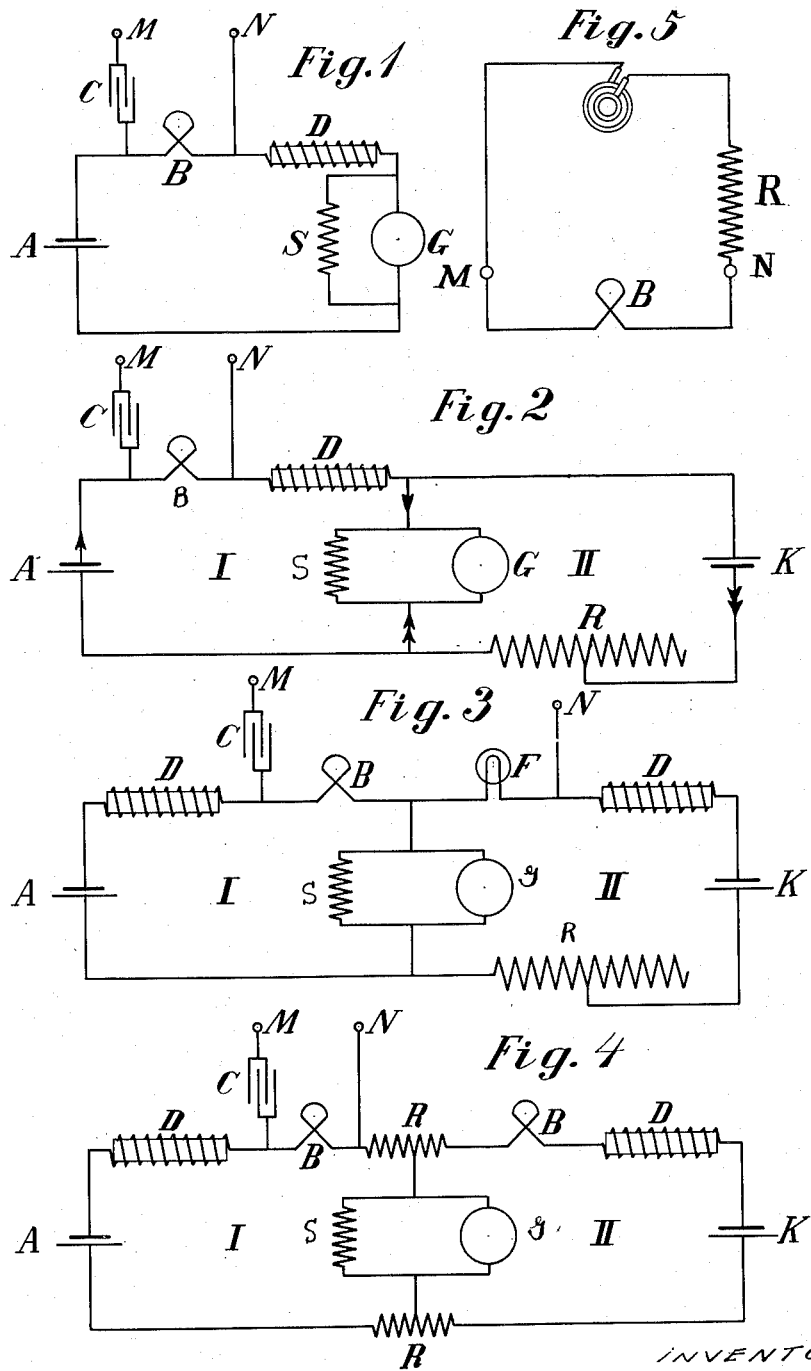

BÉLA GÁTI, OF BUDAPEST, AUSTRIA-HUNGARY.

ALTERNATING-CURRENT-MEASURING DEVICE.

1,039,925.  Specification of Letters Patent.  Patented Oct. 1, 1912.

Application filed July 20, 1907. Serial No. 384,750.

*To all whom it may concern:*

Be it known that I, BÉLA GÁTI, subject of the King of Hungary, residing at 54–56 Nagymezöutcza, Budapest, in the Empire of Austria-Hungary, have invented new and useful Improvements in Alternating-Current-Measuring Devices, of which the following is a specification.

For the measurement of alternating currents those instruments which are based on the principle of thermal effect are most suitable. For feeble alternating currents Duddel and Volge have constructed instruments, in which the alternating current works as a heating current before a thermo-battery, the electromotive force of the said thermo-battery being afterward measured by direct current galvanometers. Another method is to measure the change caused by the alternating current in some resistance. Kenelly (*Transactions of the St. Louis Electrical Congress*) uses for this purpose the so-called "barretter," a wire of 1.7 micrometer diameter.

Referring now to the accompanying drawings: Figure 1 shows the Kenelly method; Fig. 2 shows my method; Figs. 3 and 4 are some changes of my method; Fig. 5 is a detail.

In Fig. 1 A is a source of constant current, B barretter wire, C a condenser, D choking coil, G milliampermeter and S is a shunt. In the Kenelly method there circulates a constant direct current from the direct current source through the barretter; the milliampermeter shows a certain deflection. For instance, if the source of constant current is an accumulator with two volts, the barretter has 94 ohms resistance and the other part of the circuit has 6 ohms, the milliampermeter shows 20 milliamperes. If an alternating current voltage is on the terminals M. N., the alternating current, choked by the choking coil, can run only through the barretter. The very fine wire will become still more heated; its resistance will be increased and so, because the resistance of the circuit has been increased, the milliampermeter will show a smaller deflection. For instance, if the increasing of the barretter resistance is 6 ohms, the milliampermeter shows only $2/106 = 0.01886$ amperes, *i. e.*, 18.86 milliamperes. Such an increase of the barretter resistance is only possible in the case of a strong alternating current. For feebler alternating currents Kenelly uses the Wheatstone bridge with sensitive mirror-galvanometers. With these instruments Kenelly measures 2–3 microamperes.

In Fig. 2 illustrating the principle of my method, the current from the battery A goes through S, a shunt to the galvanometer; the direction of this current is denoted by the simple arrow. The current from the compensation battery goes through a variable resistance; the direction of this current is shown by the duplicate arrow. By varying the variable resistance it is always possible to regulate the circuit, so that the galvanometer does not show any deflection. If now an alternating current flows through the barretter, the resistance of the circuit I increases, and the galvanometer shows a corresponding deflection. For instance the increase in the 94 ohm barretter resistance may be 0.01 ohm. This corresponds to a strength of alternating current of about 10–20 milliamperes. With the pointer galvanometer it will be possible still to detect $10^{-7}$ ampere. $2/100$ ampere $= 20$ milliamperes give 200000 scale division deflections. If the galvanometer is compensated, we have no deflections. If in the circuit I, the alternating current runs through the barretter, the resistance of the barretter will be increased 100.01 ohms instead of 100 ohms supposing the circumstances are as in the above-mentioned instance. In the circuit I there is now a direct current $2/100.01 = 0.019.998$, amperes $= 19.998$ milliamperes. In the circuit II the 20 milliamperes remain, because in circuit II nothing was changed. The difference, $(20.000 - 19.998)$ is 2 microamperes. These 2 microamperes give in the pointer galvanometer named above 20 scale division deflections and so are measureable. The telephone talking currents with 10—20 microamperes are very feeble and yet according to my method they are measurable with pointer - galvanometers. With more sensitive mirror galvanometers it is possible to measure still more feeble alternating currents; for instance, in wireless telegraphy with telephone receivers, it is possible to make measurements, when it is impossible to hear sounds in the receiver. With a galvanometer, which measures $10^{-12}$—$10^{-13}$ amperes direct currents, it is possible to measure $10^{-10}$ amperes alternating current.

The connection between the barretter wire and the source of alternating current may be effected in various ways and Fig. 5 shows one mode of connection in which no condenser is used, the connecting circuit including the source of alternating current, the barretter wire, and preferably also a resistance R. The calibration can be made for every new barretter simply enough and best with a known (previously measured) alternating current with the help of shunts or measuring transformers. Instead of barretter wire (that is a metal wire) I can use other resistances, which vary within comparatively wide limits with the strength of the current; for instance, a filament of carbon or an electrolyte may be used by which the resistance decreases, if the strength of the current increases, or I can use a barretter B and one of the above mentioned resistances (for instance carbon-filament F) as shown in Fig. 3. With an ordinary carbon-filament incandescent lamp the initial resistance of the filament does not remain constant but changes from hour to hour, and so incandescent lamps cannot be used for precise measuring. With electrolytes the liquid must be of very small volume and because the phenomena are not well known every electrolyte needs a special investigation. Other resistances, which vary within comparatively wide limits with the strength of the currents, Nernst bodies, carbon contacts, and so on can be also used, instead of barretter-wire.

In Fig. 3 the left resistance B (barretter) is such that it increases with the increase in the strength of the current (filament of metal) and the right resistance is such that it decreases with the increase in the strength of the current (filament of carbon). If an alternating current passes both resistances, the "A" battery of the circuit I gives a feebler current, because the resistance of the left circuit becomes larger; but the compensating battery K gives a stronger current, because the resistance of the right circuit becomes smaller. The result is, that the galvanometer makes a greater deflection, and this arrangement is therefore the most sensitive one. For this arrangement two choking coils are necessary.

In Fig. 4 illustrating a modification, two barretters with equal resistances are used. The alternating current runs only through one (left side). The other barretter (right side) serves only for resistance; it is cheaper, as a separate resistance set. The resistance in the middle is used for precise regulations. This method of measuring can be used as a current detector in alternating current telegraphy, or wireless telegraphy, when the currents are either so feeble, or the frequency so high, that we cannot detect them in the telephone receivers. In this manner multiplex telegraphy can be made very simple.

What I claim as my invention and desire to secure by Letters Patent of the United States is:—

1. An arrangement for indicating the flow and strength of alternating currents comprising in combination two batteries, a resistance which is intended to be inserted in an alternating current circuit and is substantially varied by the passage of an alternating current therethrough, an adjustable resistance and a current indicator, said batteries and resistances being arranged in series to form a single closed circuit and the current indicator being connected to said closed circuit so as to form a circuit with the one battery, in which circuit the resistance first referred to and the current indicator are in series with each other and another circuit with the other battery, in which circuit the adjustable resistance and the current indicator are in series with each other, the one battery tending to send a current in the one direction and the other one a current in the opposite, direction through the indicator whereby on the passage of an alternating current through the resistance first referred to, the current tending to flow in the one direction through the indicator is increased and that tending to flow in the opposite direction therethrough is decreased, as and for the purposes set forth.

2. An arrangement for indicating the flow and strength of alternating currents comprising in combination two batteries, two variable resistances which are intended to be inserted in an alternating current circuit, one of which is substantially increased and the other one substantially decreased by the passage of an alternating current therethrough, an adjustable resistance and a current indicator, said batteries and resistances being arranged in series to form a single closed circuit and the current indicator being connected to said closed circuit so as to form a circuit with the one battery, in which circuit one of said variable resistances is in series with the current indicator, and another circuit with the other battery, in which circuit, the current indicator is in series with the other variable resistance and with the adjustable resistance, the one battery tending to send a current in the one direction and the other one a current in the opposite direction through the indicator, whereby on the passage of an alternating current through the two variable resistances the current tending to flow in the one direction through the indicator is increased and that tending to flow in the opposite direction therethrough is decreased, as and for the purpose set forth.

3. An arrangement for indicating the flow and strength of alternating currents comprising in combination two batteries, two variable resistances which are intended to be inserted in an alternating current circuit, one of which is substantially increased and the other one substantially decreased by the passage of an alternating current therethrough, an adjustable resistance two choking coils and a current indicator, with a shunt thereto, said batteries, resistances and choking coils being arranged in series to form a single closed circuit and the current indicator being connected to said circuit so as to form a circuit with the one battery, in which circuit the current indicator is in series with one of the variable resistances and with one choking coil, and another circuit with the other battery, in which circuit the current indicator is in series with the other variable resistance, and choking coil and with the adjustable resistance, the one battery tending to send a current in the one direction and the other one a current in the opposite direction through the indicator, as and for the purposes set forth.

4. An arrangement for indicating the flow and strength of alternating currents comprising in combination two variable resistances and a condenser intended to be inserted in an alternating current circuit one of said resistances being substantially increased and the other one substantially decreased by the passage of an alternating current therethrough, two batteries, an adjustable resistance, two choking coils and a current indicator, with a shunt thereto, said batteries, resistances and choking coils being arranged in series to form a single closed circuit and the current indicator being connected to said closed circuit so as to form a circuit with the one battery, in which circuit the current indicator is in series with one of the variable resistances and with one choking coil, and another circuit with the other battery, in which circuit the current indicator is in series with the other variable resistance and choking coil, and with the adjustable resistance, the one battery tending to send a current in the one direction and the other one a current in the opposite direction through the indicator, as and for the purposes set forth.

In testimony whereof I have signed my name to this specification in the presence of two subscribing witnesses.

BÉLA GÁTI.

Witnesses:
  ERNEST MEUER,
  CHARLES EDWARD ZATINO.